April 6, 1948.  D. D. JONES  2,438,974
EXTRUDING APPARATUS
Filed May 11, 1944  3 Sheets-Sheet 1
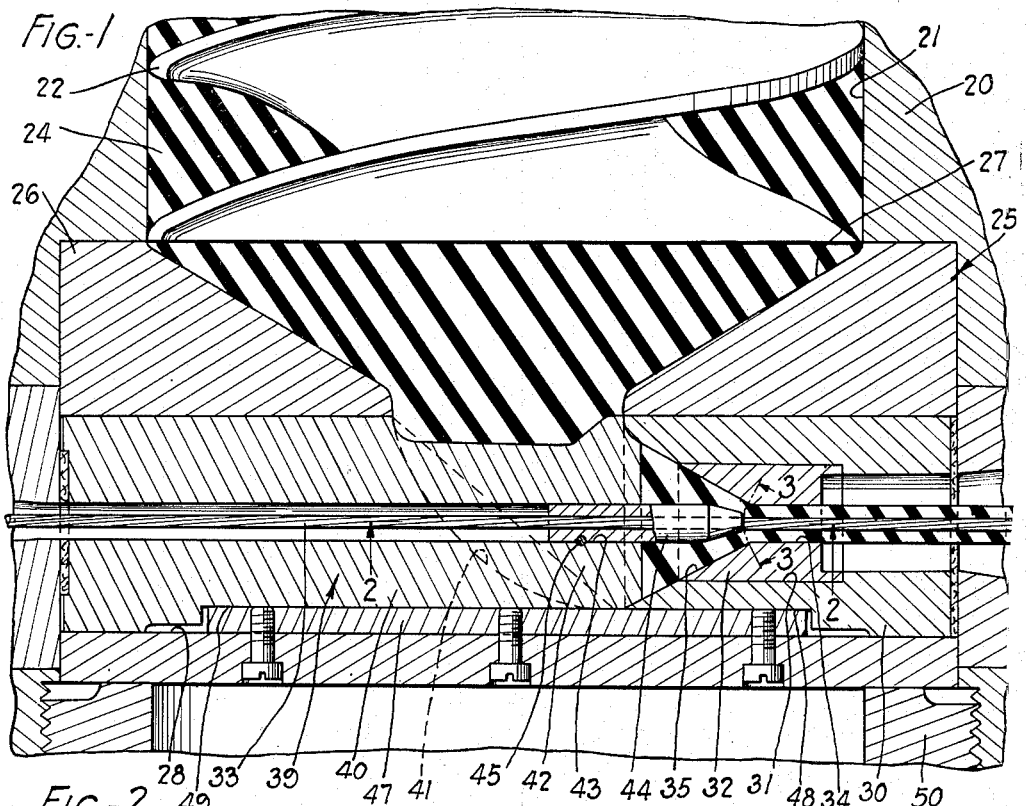
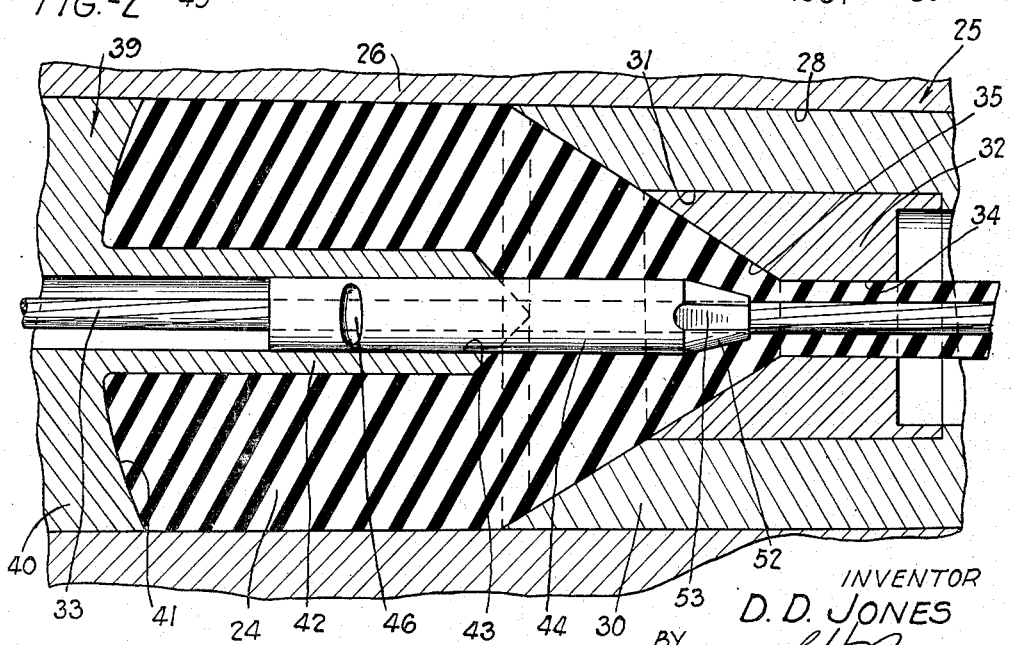
INVENTOR
D. D. JONES
BY
ATTORNEY April 6, 1948.  D. D. JONES  2,438,974
EXTRUDING APPARATUS
Filed May 11, 1944  3 Sheets-Sheet 2

INVENTOR
D. D. JONES
ATTORNEY

INVENTOR
D. D. JONES
BY
ATTORNEY

Patented Apr. 6, 1948

2,438,974

UNITED STATES PATENT OFFICE 2,438,974

EXTRUDING APPARATUS

David D. Jones, Towson, Md., assignor to Western Electric Company, Incorporated, New York, N. Y., a corporation of New York Application May 11, 1944, Serial No. 535,104

6 Claims. (Cl. 18—13)

This invention relates to extruding apparatus, and particularly to apparatus for extruding insulating or jacketing material on conductors or other cores and methods of making such apparatus.

Objects of the invention are to provide new and improved extruding apparatus and to provide new and improved methods of making extruding apparatus.

In utilizing much of the rubber and plastics insulating and jacketing equipment available today, the centering of a conductor with respect to the material extruded therearound is accomplished by adjusting the components of the extruding head manually at each setup for a given combination of conductor and material. Even when skilled operators are employed, a considerable amount of operating time is lost in making the adjustments necessary to produce commercially acceptable products.

Much of this time may be saved by the use of a so-called "self-centering" extruding head, which essentially is a head in which the component parts are designed to be assembled in a given position for each setup without any adjustment of the parts. With the use of self-centering heads, the relative positions of the several parts of the head are fixed and the extruding tools are placed in their proper operating position each time the head is assembled. One type of self-centering head is shown in G. L. Cherry et al. Patent 1,862,005, granted June 7, 1932.

In general, the type of apparatus shown in this patent comprises a block having a cylindrical bore therein, in which is positioned a stock screw. The stock screw forces extrudable material, such as a rubber compound, into the extruding head proper, which is provided with an extrusion passage that communicates with and extends transversely across the exit end of the cylindrical bore. A core guide is located at one end of the transverse insulating passage, and a conductor to be insulated is advanced through a central opening in the core guide and into the passage at a point closely adjacent to a forming die located in the other end of the passage. The core guide is provided with a deflector, which directs the extrudable material toward the die.

The core guide has a small core tube projecting from the exit end thereof toward the die, and the thickness of the extruded coating applied to the conductor depends, among other things, upon the width of the space between the core tube and the die. The core tube fits snugly over the conductor and guides the conductor through the die. In order to produce an insulated or jacketed conductor having a concentric covering thereon, the conductor should pass through the center of the die orifice and one function of the core tube is to guide the conductor accurately into the die.

The production of concentrically covered conductors by the use of the self-centering types of extruding heads is dependent principally upon two factors. First, all parts of the head must be accurately machined for precise assembly. Second, the flow of covering material at the point of minimum clearance between the core tube and the forming die must be balanced in quantity. The design of the usual self-centering head provides for a change in the direction of the flow of covering material between the impelling mechanism, usually a stock screw, and the point of extrusion. This point of extrusion occurs critically at the point of minimum clearance between the core tube and the forming die. This design has evolved because it insures stability of the extruding tools, and provides for the most facile arrangement of tools for servicing and for handling of the wire before and after being covered, especially when the head is used in conjunction with continuous vulcanizing apparatus. Continuous vulcanizing apparatus is disclosed schematically in the aforementioned Patent 1,862,005, and more specifically in Lamplough Patent 1,689,205, granted October 30, 1928.

Since wires of the type used for electrical conductors are substantially uniform in diameter, when solid wires are covered it is possible to use core tubes which fit closely over the wires and guide the wires accurately through the forming dies. Despite this fact, there frequently is some slight eccentricity in the covering formed on the conductors when solid conductors, such as copper wires, are covered in the usual self-centering insulating heads. However, the amount of eccentricity generally can be held within commercial limits by the use of precision methods in manufacturing the parts of the extruding heads, particularly the core tubes and dies.

On the other hand, when stranded conductors or cabled cores are covered, the tendency toward eccentricity in the coverings is accentuated. This is due to several factors which cause variations in the diameter of the stranded conductors or cabled cores. For example, variation in the tension applied during the stranding operation will be reflected in variations in the diameters of stranded conductors. Also, the individual strands frequently become crossed during the fabrication of stranded conductors, and at each cross-over there will be an enlarged point in the finished product. It is customary to splice the ends of stranded conductors by brazing to produce cores of desired lengths, and the brazed splices also lead to considerable variations in the diameters of the stranded conductors.

In producing extruded coverings on stranded conductors, allowance must be made for these variations and the inside diameters of the core tubes employed must be sufficiently large to permit those portions of the conductors having the largest diameters to pass therethrough. As a result, the core tubes may not engage considerable portions of the conductors closely enough to guide the conductors with sufficient accuracy to maintain commercial standards in the concentricity of the coverings in the finished product.

As pointed out previously, the quantity of flow of an extrudable material through extruding heads should be balanced, and one of the principal causes of eccentricity in coverings applied to conductors is the presence of unbalanced flow conditions in the extruding heads. This is especially true when stranded conductors are covered, and the need for balanced flow conditions is increased when stranded conductors are used.

In accordance with this invention, a balanced flow of covering materials in extruding heads is obtained by increasing the cross sectional area of the extrusion orifice, in portions of an extrusion head where the pressure head of the material being extruded is low, by an amount that is proportionate to the pressure heads of the material in different portions of the extruding head. As a result, the coverings on covered conductors made with extruding apparatus embodying the invention are substantially concentric with the conductors, whether the conductors are solid or stranded, and the covered conductors meet the standards for commercially acceptable products.

The invention will be clearly understood from the following detailed description of a preferred embodiment of the invention, when read in conjunction with the accompanying drawings, in which Fig. 1 is a fragmentary, horizontal sectional view of an extruding apparatus embodying the invention;

Fig. 2 is an enlarged, fragmentary, vertical sectional view taken on line 2—2 of Fig. 1;

In the usual self-centering extruding head, the rate of flow of the extruded material through the extrusion passage is not particularly important except through that portion of the extrusion orifice where the tip of the core tube and the orfice of the forming die are closest to each other. The balance of the rate of flow of the material at that point in the extrusion orifice is critical because it is there that the covering applied to the conductor is supplied to the die in proper quantities to insure the desired final configuration in the covering. Hence, this point will be designated hereinafter the point of critical clearance. An analysis of the factors affecting the balance of flow of materials in extruding apparatus indicates that concentric coverings can be produced only when the rate of flow of the materials is equal at all points over the annular cross sectional area of the extrusion orifice at the point of critical clearance.

Figure 5:
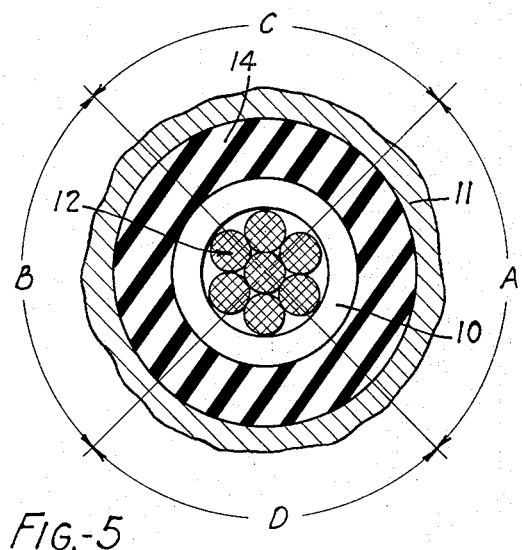
Fig. 5 is a fragmentary view similar to that shown in Fig. 3 of a portion of a self-centering extruding head of the type formerly known to the art.

Referring now to Fig. 5 of the drawings, this figure represents a cross section through the point of critical clearance in the usual type of self-centering extruding head, such as is shown in the above-mentioned Patent Number 1,862,005, when used to apply a tubular covering of insulation upon a single conductor composed of stranded wires. In this figure the end of the core tube is represented by the numeral 10 and the die is designated 11. A stranded conductor 12 is advanced through the core tube 10 and is covered by an insulating material 14, which is forced by a stock screw under high pressure through the annular extrusion orifice formed by the tip of the core tube and the opening of the die.

The quadrant of the extrusion orifice represented by the letter "A" is the one nearest to the impelling stock screw, quadrant B is the one farthest away from the stock screw, and quadrants C and D are the intermediate quadrants. The pressure head of the insulating material at any given point in the extruding head is dependent upon the length of the path traversed by the compound from the stock screw to that point, the shorter the path the higher the pressure head and vice versa. Since the quadrant A is closest to the stock screw, the insulating material supplied thereto follows the shortest path from the stock screw and, consequently, the highest value of pressure head in the insulating material at the point of critical clearance occurs in that quadrant. Conversely, the insulating material in quadrant B, which is directly opposite to the quadrant A, has the lowest pressure head at the point of critical clearance, and the material in each of quadrants C and D has a pressure head which is intermediate those found in quadrants A and B.

It is characteristic of the self-centering type of head that, when eccentricity occurs in the the insulating coverings, the portion of the eccentric insulation having the thinnest section is found in that part of the insulation that is produced in quadrant B of the extrusion orifice, and that portion of the eccentric insulation having the greatest cross section is produced in quadrant A of that orifice. It has been found that by equalizing the rates of flow of the insulating material extruded from each of the two critical quadrants A and B of the extruding head, the variations in the pressure heads of the insulating material in those quadrants are compensated or balanced, and it is possible with such a compensated head to produce consistently insulated conductors having concentric insulating coverings.

Figure 3:
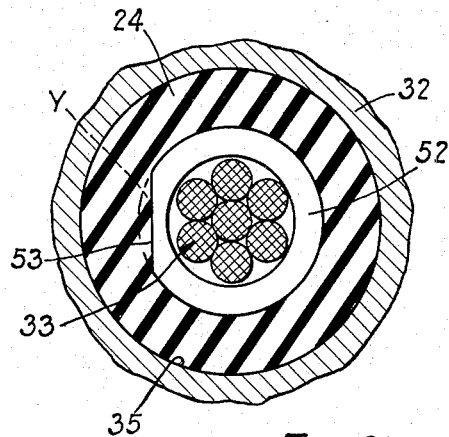
Fig. 3 is a further enlarged, fragmentary, sectional view taken on line 3—3 of Fig. 1.

Extruding apparatus embodying the invention is shown in Figs. 1, 2 and 3 of the drawings. This apparatus is designed to apply an insulating covering upon conductors, and includes an extruding head compensated in accordance with methods embodying the invention.

Referring now to Fig. 1, there is provided a body portion 20 having formed therein a cylindrical bore 21 in which a stock screw 22, rotated by a suitable source of power (not shown), is mounted for the purpose of forcing an insulating material 24 through an extruding head, designated generally by the numeral 25. The extruding head 25 comprises a body member 26 provided with a tapered opening 27 which forms a continuation of the bore 21 and which communicates with a cylindrical bore 28 formed in the head transversely of the tapered opening 27.

Slidably mounted within the bore 28 is a cylindrical die holder 30 having a central cylindrical bore 31 for accommodating a forming die 32, designed to impart the desired ultimate configuration to the outer surface of the insulating covering applied to a conductor 33 which is advanced therethrough by conventional apparatus (not shown). In this embodiment of the invention, the extrusion die has a cylindrical opening 34 therein which extends towards the interior of the bore 28 and joins a frusto-conical opening 35. The die is designed to form an insulating covering of circular cross section upon a conductor advanced therethrough.

Mounted within the cylindrical bore 28 to the left of the die holder 30, as seen in Fig. 1, is a core guide 39 consisting of a centrally apertured, cylindrical core tube holder 40 having an inclined curved surface 41 for deflecting the insulating material towards the die 32. The core tube holder 40 also has a central fin 42 for dividing the insulating material into two portions and distributing it evenly upon the conductor 33 being insulated. Mounted within a bore 43 formed in the fin 42 is a centrally apertured, cylindrical core tube 44 which serves to guide the conductor 33 and to center it accurately with respect to the die 32. The core tube 44 is held in a predetermined position in the bore 43 and prevented from moving by a pin 45, which engages a groove 46 (Fig. 2) formed in the core tube.

The die holder and the core guide are maintained in alignment with respect to each other by an aligning plate 47 secured within the bore 28 and engaging cooperating flat surfaces 48 and 49 formed in the die holder 30 and core tube holder 40, respectively. The entire insulating head 25 is retained within the body portion 20 by means of a retaining nut 50.

Figure 4:
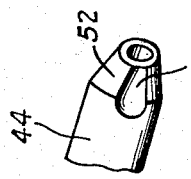
Fig. 4 is an enlarged, fragmentary, perspective view showing the exit end of a core tube forming part of the apparatus.

Referring now to Figs. 2, 3 and 4 of the drawings, it will be observed that the core tube 44 has a frusto-conical end portion 52, which has a flat surface 53 formed thereon by grinding away part of the frusto-conical portion 52. The amount of the core tube removed in producing the flat surface 53 is just sufficient to equalize the quantity of insulating material extruded through that portion of the extrusion orifice adjacent thereto with that extruded through that portion of the extrusion orifice directly opposite to the surface 53. The variations in the pressure heads of the insulating material in those two portions of the extrusion orifice are compensated for by the larger cross sectional extrusion area provided adjacent to the surface 53. In consequence, the conductor being insulated is provided with a concentric covering of insulating material despite the fact that the core tube opening may be large enough to accommodate a stranded conductor that is subject to fairly wide variations in cross sectional area and the conductor is somewhat free to move laterally. The cross sectional area of the portion of the core tube that is removed, which is represented by the segment designated "Y" in Fig. 3 of the drawings, may be computed in accordance with a formula which will now be developed.

Referring again to Fig. 5 of the drawings, it will be recalled that the pressure heads differ in the quadrants A and B of an uncompensated extruding head and, as a result, different quantities of insulating material flow through these two quadrants. In order to have an equal quantity of material flowing through these two quadrants, the cross sectional area of the extrusion orifice in quadrant B must be increased at the point of critical clearance by an amount sufficient to compensate for the difference in pressure heads. For the purpose of determining the proper relationship between the cross sectional area of quadrants A and B, the following basic formulae for flow through orifices may be employed:

$$Q_a = KA_a\sqrt{2gh_a}$$

where $Q_a$ = rate of flow of material through quadrant A of the extrusion orifice.
$K$ = a constant.
$A_a$ = area of quadrant A of the extrusion orifice.
$g$ = acceleration due to gravity.
$h_a$ = pressure head in quadrant A of the extrusion orifice.

and $$Q_b = KA_b\sqrt{2gh_b}$$

where $Q_b$ = rate of flow of material through quadrant B of the extrusion orifice.
$K$ = a constant.
$A_b$ = area of quadrant B of the extrusion orifice.
$h_b$ = pressure head in quadrant B of the extrusion orifice.

To achieve concentricity in the extruded insulating covering, $Q_a$ must equal $Q_b$, and when this occurs $$KA_a\sqrt{2gh_a} = KA_b\sqrt{2gh_b}$$

or $$A_a\sqrt{h_a} = A_b\sqrt{h_b}$$

and $$\frac{A_a}{A_b} = \frac{\sqrt{h_b}}{\sqrt{h_a}} = \sqrt{\frac{h_b}{h_a}}$$

Thus, to produce a concentric insulating covering the ratio of the areas of the quadrants A and B must be inversely proportional to the square root of the ratio of the respective pressure heads in those quadrants. These pressure heads are known to be unbalanced and to vary inversely with the length of the path of flow of compound to the point of extrusion. The losses in pressure which occur are friction losses which are proportional, among other things, to the length of the path traversed by the insulating material.

In any given type of self-centering extruding head, the normal paths of flow to all parts of the extrusion orifice are consistent, and variations in the path of flow from the normal will occur only in special conditions where the extruded material used differs greatly in shear and friction characteristics from the general run of materials. Consequently, for most purposes, when the relation $$\frac{h_b}{h_a}$$

has once been established in a given type of extruding head, this value may be used to compensate any extruding tools used in that particular design of head.

For instance, by visual analysis and actual trials with a head of the type shown in the drawings, in which the extrusion passage, represented by the bore 28 shown in Fig. 1 of the drawings, is one inch in diameter, the value of $$\frac{h_b}{h_a}$$

has been found to be $$\frac{1}{1.151} \text{ and } \sqrt{\frac{h_b}{h_a}} \text{ equals } 0.932$$

Thus, in order to produce equalized flow in this type of head, $$\frac{A_a}{A_b}$$

must equal 0.932. If $$\frac{A_a}{A_b} = 0.932$$

then $$A_b = \frac{A_a}{0.932} = 1.073 A_a$$

Knowing this relationship, it is possible to increase the cross sectional area of the quadrant B by the precise amount necessary to provide for equalized flow, and consistently to produce commercially concentric insulating coverings under all ordinary conditions.

The increase in orifice area in quadrant B is accomplished most readily by grinding a flat surface on the tip of the core tube in that quadrant in the manner described hereinabove, since this method is the simplest from the standpoint of tool making and control of dimensions. It, of course, would be possible to remove a corresponding amount from that portion of the die which is adjacent to quadrant B at the point of critical clearance in the extrusion orifice. Likewise, similar results may be obtained by increasing the cross sectional area of that portion of the tip of the core tube that lies in quadrant A at the point of critical clearance by the amount necessary to provide the proper ratio between the areas of quadrants A and B. However, it is obvious that either of the latter alternatives would involve difficulties that do not arise when the compensation is done by removing the requisite amount from the tip of the core tube.

By similar observations and calculations with reference to a similar self-centering head having an extrusion passage one and one-half inches in diameter, it has been determined that the ratio $$\frac{h_b}{h_a} \text{ is } \frac{1}{1.181}$$

and that $$\sqrt{\frac{h_b}{h_a}} = 0.92$$

Therefore, $$A_b = \frac{A_a}{0.92} = 1.087 A_a$$

when equalized flow is obtained in this type and size of insulating head.

The calculations involved in computing the amount of compensation for each combination of forming die and core tube for a given size of head of a particular type and the proposed depth of cut necessary to obtain a given compensation are somewhat laborious. These calculations may be simplified by the use of graphs, such as those illustrated in Figs. 6 and 7 of the drawings.

Figure 6:
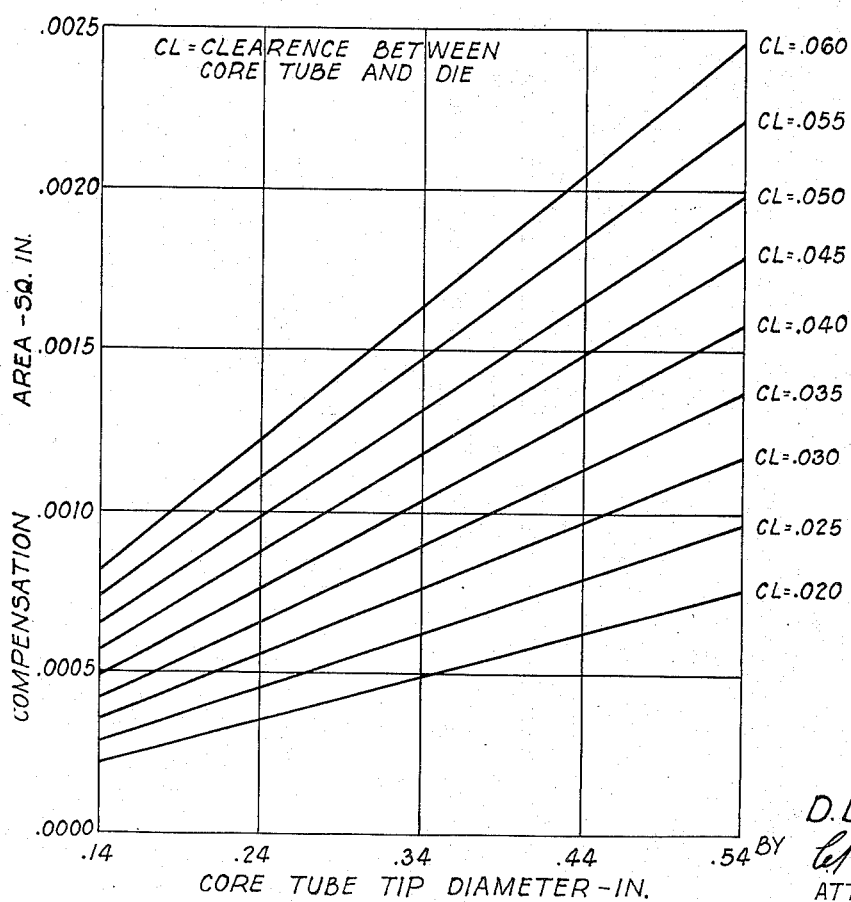
Figs. 6 and 7 are charts showing certain relationships between some of the component parts of the apparatus.

Fig. 6 represents the relationship between the compensating area that should be provided in quadrant B for various core tube sizes and for different clearances between the core tube and forming die for a head having a one and one-half inch extrusion passage. This curve was obtained by utilizing the expression $A_b = 1.087 A_a$, referred to in the preceding paragraph.

Thus, for example, when a core tube having an external diameter at the tip of .34 inch is to be used in a head in which the clearance between the core tube tip and the die orifice is intended to be .025 inch, one can determine the amount of the compensating area to be provided through the removal of a portion of that side of the tip that is to be positioned in quadrant B by reference to the chart shown in Fig. 6. The compensating area is found by following a vertical line from the value .34 inch on the horizontal ordinate of the chart until it intersects the line marked Cl=.025, and then finding the value of the corresponding compensating area from the vertical ordinate, which value in this case is .00062 square inch.

Figure 7:
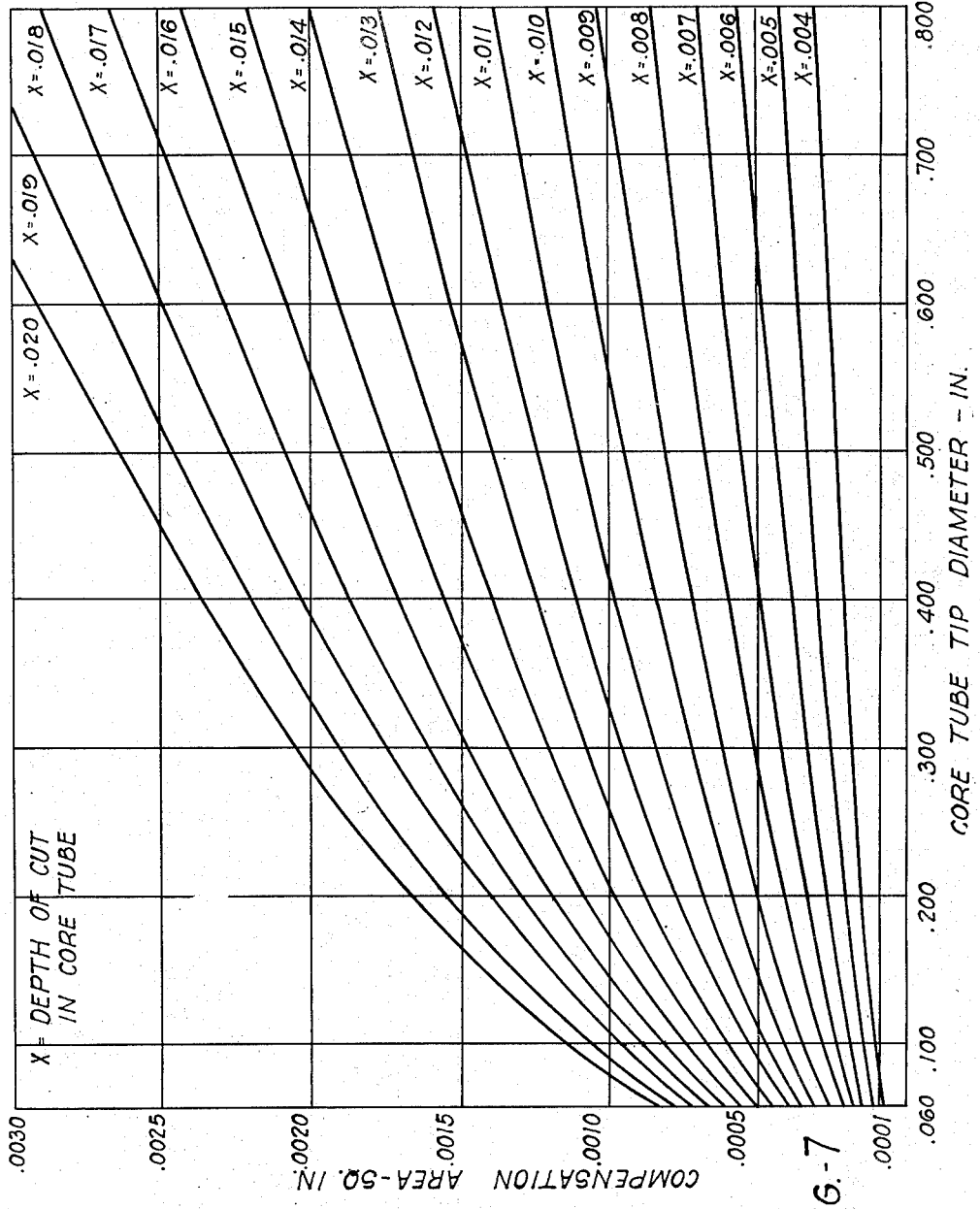

In Fig. 7 there is represented a chart showing the depth of cut that is required to provide any given compensating area for a particular size of core tube of the design shown in Figs. 1 to 4 of the drawings. The values shown on this chart were derived by calculations based on the size and shape of the core tubes. After having determined, by referring to a chart like that shown in Fig. 6, the compensation area needed for the size of core tube and width of clearance desired, one may determine readily, by reference to a chart like that shown in Fig. 7, the depth of cut needed for that size of core tube to provide the needed compensation area.

Thus, in order to provide a compensating area of .00062 square inch for a core tube having a tip diameter of .34 inch, the depth of cut necessary is .0086 inch. This value may be determined by interpolating the value for X, which is the depth of cut, at the point of intersection of the value .00062 for the compensating area and the value .34 for the core tube tip diameter. Knowing the depth of cut necessary, it is then a relatively simple matter to set up the tools used to grind or cut a flat on the tip of the core tube to provide that depth of cut.

As stated previously, when these several values have been determined for a given type and size of self-centering extruding head, they may be used to compensate any other heads of the same type and size without any further calculations. The heads so compensated will produce insulated conductors having insulating coverings that are sufficiently concentric to meet commercial standards.

Such compensated heads may be used with satisfactory results to apply any of the ordinary insulating materials to solid or stranded conductors, to cabled cores, and to cores having braided, knitted or served metallic or textile shields applied thereto. These heads may be employed to extrude insulating coverings composed of the usual rubber compounds, as well as rubber-like compounds, such as those made of buna and butyl rubbers, polymerized chloroprene and polysulphide rubbers. They are especially useful for applying plastic coatings to bare conductors. Among the plastics that may be used with such heads are the polyvinyl chloride plastics and those produced by the conjoint polymerization of vinyl chloride and vinyl acetate. Obviously, other extrudable insulating, jacketing or coating materials may be used with similar results.

It has been found that if the extruded materials used are within the normal commercial range of extrudability, the same basic formula will apply to all these materials. If the material employed has characteristics that differ greatly from those of the usual run of materials, a separate calculation and compensation may be made. However, even when such unusual materials are used in an extruding head that has been compensated so as to be usable with the types of materials usually employed to cover conductors, the covering on the resulting product will be more uniform from the standpoint of concentricity than would be the case if an uncompensated head were employed.

Obviously, the computations and charts referred to hereinabove are applicable only to extruding heads of the type shown in the drawing and having core tubes and dies of the configuration shown. For other designs of heads and for other kinds of core tubes and dies, separate observations and computations will be required. However, with any type of head, the basic concept of this invention applies and commercially satisfactory covered conductors may be made with heads compensated in accordance with this invention. Concentric coverings will result when the cross sectional areas of portions of the extrusion orifice at the point of critical clearance are compensated in proportion to the pressure heads of the material extruded therein so that the rate of flow of the material is substantially balanced throughout this orifice.

This invention is not limited to the compensation of extruding heads designed to apply coverings of circular cross section on conductors, but may also be utilized to compensate apparatus intended to produce extruded coverings of elliptical or other shaped cross section. Nor is it limited to compensating only that quadrant of the extrusion orifice which is farthest away from the stock screw, since the other quadrants may be enlarged or decreased in cross sectional area in accordance with the invention to insure still greater uniformity in the rate of flow of the extruded material throughout the extrusion orifice.

The above-outlined examples have been given merely to illustrate the invention and not to limit the scope thereof, which is limited only by the terms of the annexed claims.

What is claimed is:

1. In extruding apparatus designed to insulate cores, such as conductors and the like, and including a body member having an elongated extrusion passage therethrough, a forming die having a circular extrusion opening therein positioned at one end of the passage, impelling means for forcing material into the extrusion passage at a point removed from the die and substantially at right angles to the longitudinal axis of the passage, and a core guide provided with a deflecting surface for causing insulating material entering the passage to flow towards the die, a core tube secured at one end thereof to the core guide and having the other end thereof adjacent to the die opening, thereby forming an extrusion orifice between the end of the core tube and the die opening, which core tube consists of a centrally-apertured, cylindrical body member having a generally frusto-conical tip on the end thereof adjacent to the die and having only on that side of the tip which is farthest away from the impelling means a flat surface lying in a plane which is parallel to and below a line tangent to the frusto-conical surface of the tip, whereby the cross sectional area of that portion of the extrusion orifice which is nearest to the flat surface is greater than the cross sectional areas of like portions of the remainder of the extrusion orifice.

2. A core tube for a self-centering insulating head designed to insulate cores, such as conductors and the like, which comprises a centrally apertured, cylindrical body member having a frusto-conical tip from the curved surface of which has been removed a flat-bottomed section of sufficient volume to compensate for unequal extrusion pressures which occur in the self-centering type of insulating head.

3. Apparatus for extruding plastics, which comprises a body member having an extrusion passage therethrough, a forming die having a circular extrusion opening positioned at the exit end of the passage, impelling means for forcing insulating material through the passage and the die, and a generally cylindrical member so positioned in the passage adjacent to the die as to form an extrusion orifice between the end of the member and the opening in the die, said member having a flat surface at the end thereof adjacent to the die and at a point of low extrusion pressure, which flat surface is of such dimension as to increase the rate of flow of insulating compound through the extrusion orifice at that point sufficiently to be substantially equal to that at a point of higher extrusion pressure.

4. Extruding apparatus designed to insulate cores, such as conductors and the like, which comprises a body member having a passageway therein for the passage of material to be extruded, a forming die positioned at one end of the passageway and having a circular passage therethrough, impelling means for forcing insulating material into the passageway substantially at right angles to the longitudinal axis thereof, and a core guide adjacent to the die for directing a core through the die and coacting with the opening in the die to form an extrusion orifice at the end of said passageway, said core guide comprising a centrally apertured, cylindrical body member having a frusto-conical tip on the end thereof nearest to the die from which tip has been removed a flat-bottomed portion of that side thereof which is farthest removed from the impelling means sufficient to cause substantially equal volumes of insulating material to flow through all portions of the extrusion orifice.

5. Extruding apparatus designed to insulate cores, such as conductors and the like, which comprises a body member having a passageway therethrough for the passage of material to be extruded, a forming die positioned at one end of the passageway and having a circular passage therethrough, impelling means for forcing vulcanizable insulating material into the passageway substantially at right angles to the longitudinal axis thereof, a core guide provided with a deflecting surface for causing the insulating material entering the passageway to flow toward the die, and a core tube secured at one end thereof to the core guide and having the other end thereof adjacent to the forming die, said core tube consisting of a centrally-apertured, cylindrical body member having a frusto-conical tip on the end thereof adjacent to the die from which tip a flat-bottomed portion has been removed only on that side thereof which is farthest away from the impelling means to compensate for unequal pressures in the passageway, said tip coacting with the circular passage in the die to form an extrusion orifice which is generally annular but is enlarged where the portion has been removed from the tip, whereby substantially equal volumes of insulating material are caused to flow through all portions of the extrusion orifice.

6. Extruding apparatus designed to insulate cores, such as conductors and the like, which comprises a body member having an extrusion passage therethrough, a forming die having a circular passage therethrough and positioned at one end of the passageway, impelling means for forcing insulating material into the passage substantially at right angles to the longitudinal axis thereof, a core guide provided with a deflecting surface for causing the insulating material entering the passage to flow toward the die, and a core tube secured at one end thereof to the core guide and having the other end thereof adjacent to the forming die and coacting with the circular passage in the die to form an extrusion orifice at the exit end of said passage, said core tube consisting of a centrally apertured, cylindrical body member having a frusto-conical tip on the end thereof adjacent to the die from which tip a flat-bottomed portion has been removed at one side of and along the entire frusto-conical portion thereof to compensate for unequal pressures in the extrusion orifice.

DAVID D. JONES.

REFERENCES CITED

The following references are of record in the file of this patent:

UNITED STATES PATENTS

| Number | Name | Date |
|---|---|---|
| 670,611 | Hoffmann | Mar. 26, 1901 |
| 1,180,399 | Houben | Apr. 25, 1916 |
| 1,770,985 | Kivley | July 22, 1930 |

FOREIGN PATENTS

| Number | Country | Date |
|---|---|---|
| 337,520 | Great Britain | Nov. 6, 1930 |